3,410,693
ACTIVE DRY YEAST CONTAINING
A SUCROSE DIESTER
Seymour Pomper, Stamford, Conn., and Emanuel Akerman, Bronx, N.Y., assignors to Standard Brands Incorporated, New York, N.Y., a corporation of Delaware
No Drawing. Filed Oct. 20, 1965, Ser. No. 499,023
10 Claims. (Cl. 99—96)

ABSTRACT OF THE DISCLOSURE

An active dry yeast comprising yeast having a moisture content below about 7.5 percent by weight and a small amount of sucrose diester derived from a saturated fatty acid having a carbon chain length greater than 12. The sucrose diester imparts to the yeast superior leavening activity. Examples of suitable sucrose diesters are sucrose distearate and sucrose dipalmitate.

---

This invention relates to a novel active dry yeast product and a process for preparing the same.

Commercial active dry yeast, sold today, is a yeast product which has been dehydrated under controlled conditions to a moisture content of about 8 percent by weight. The keeping qualities and cool water tolerance of yeast are directly dependent upon its moisture content. At high moisture levels, yeast will have poor keeping qualities while at low moisture levels it will have good keeping qualities. However, in the case of the cool water tolerance of yeast, just the opposite is true; that is, at high moisture levels cool water tolerance will be good while at low moisture levels it will be poor. Cool water tolerance is a measure of a yeast's leavening activity after it has been rehydrated in cool water; for instance, in water at 70° F. Also, during the drying procedure, an appreciable part of the yeast's leavening activity is destroyed. Thus, the 8 percent moisture level has been selected so that the active dry yeast has relatively good keeping qualities, its leavening activity has not been damaged to too great an extent and it has fair cool water tolerance.

It is the principal object of the present invention to provide a low moisture active dry yeast with improved initial leavening activity. It is a further object of the present invention to provide an active dry yeast which may be rehydrated in cool water without substantial reduction of its leavening ability. A still further object of the present invention is to provide a dry yeast with a high degree of storage stability.

We have found that the above objects may be accomplished by incorporating into yeast, prior to drying the yeast, a small amount of a sucrose diester derived from a saturated fatty acid having a carbon chain length greater than 12.

Examples of sucrose diesters which we found to be preferable are sucrose distearate and sucrose dipalmitate manufactured by Colonial Sugars Company and sold under the code designations SES-2, P-1 and SEP-2, P-1 respectively. In the Bulletin SE-1, 2 III (3/24/64) entitled "Colonial SE Surfactants" distributed by Colonial Sugars Company it is mentioned that the largest proportion of the fatty acid groups may well be on the two primary hydroxyls at the extreme ends of the sucrose molecule.

The diesters may be introduced into the yeast at any point prior to drying the yeast provided they are substantially uniformly distributed in the final dried yeast. It is convenient to form a fine suspension or emulsion of the diester in a suitable solvent, heat the suspension or emulsion with stirring until the diester is substantially dissolved and then mix the solution directly with cream or compressed yeast.

The amount of diester, based on the weight of the final active dry yeast product, may vary over a relatively wide range. Very small amounts have given beneficial results, for example 0.5%. However, the preferred amount of the diester varies between about 1 and about 3 percent by weight. Larger amounts may be added but they do not appear to confer any additional benefit.

A further embodiment of the invention is the provision of an anti-oxidant in the active dry yeast product of the present invention. Examples of suitable antioxidants are butylated hydroxyanisole and butylated hydroxytoluene. These antioxidants stabilize the dry yeast product so that it may be stored under atmospheric conditions without incurring substantial loss of its leavening activity. Very small amounts of the antioxidant are sufficient, for instance, about 0.025 to about 0.5 percent based on the weight of the yeast solids. Larger amounts may be used but they do not appear to confer any additional benefit. The greatest benefit seems to be obtained with amounts between about 0.1 and about 0.2 percent.

The antioxidant may be incorporated in the moist yeast at any stage prior to drying the yeast. It is convenient to add the antioxidant in solution in an edible carrier. Exemplary of edible carriers we prefer to use are vegetable oils which are liquid at room temperatures, for instance, peanut oil, soybean oil, corn oil, cottonseed oil, sunflower oil and safflower oil. However, edible carriers which are solid at room temperature may be used by simply heating the carrier above its melting point before admixing with the antioxidant and maintaining this temperature while the solution is being incorporated into the yeast. Synthetic edible carriers may also be used, for instance, propylene glycol.

The moisture content of the active dry yeast of the present invention should be below about 7.5 percent by weight and preferably between about 4 and about 7 percent by weight.

In order to more clearly describe the nature of the present invention, specific examples will hereinafter be described. It should be understood, however, that this is done solely by way of example and is intended neither to delineate the scope of the invention nor limit the ambit of the appended claims. In the example and throughout the specifications, percentages are intended to refer to percent by weight unless otherwise specified.

EXAMPLE I

This example illustrates the preparation of active dry yeast products of the present invention and their leavening superiority over control samples both initially and after storage in an inert atmosphere.

18.4 grams of sucrose dipalmitate were suspended in 368 ml. of a 1% NaOH solution and the suspension heated to 170° F. This suspension was cooled to 140° F. and slowly incorporated with mixing into 4 kg. of cream yeast containing 22.9 percent solids. The treated yeast was stirred for one-half hour and concentrated by filtration and pressing to 35 percent yeast solids. The yeast was then extruded into spaghetti form and dried in a temperature range from 95° to 120° F. and at a relative humidity of from about 70 to about 10 percent. The drying time was about 7 hours.

The dried yeast was tested for its initial leavening activity in a sweet dough formula and also tested for leavening activity after storage for seven days at 115° F. in nitrogen.

Prior to the preparation of the sweet dough, the dry yeast was rehydrated in warm water (100° F.). Leavening activity is defined as follows:

Fermentation time

The time required for a given weight of sweet dough, maintained at 86° F., to rise to a predetermined volume.

Proof time

The time required for the dough to reach this volume at the same temperature after being punched down.

The same procedure as above was used for adding sucrose distearate and the effect of this diester on the active dry yeast was tested in the same manner.

The results of these tests are shown in Table I.

TABLE I

| Treatment | Percent moisture | Initial Leavening Activity | | Leavening Activity After Storage for 7 Days at 115° F. in nitrogen | |
|---|---|---|---|---|---|
| | | Fermentation Time | Proof Time | Fermentation Time | Proof Time |
| Control | 7.8 | 88 | 63 | 157 | 131 |
| Do | 4.7 | 153 | 106 | 152 | 141 |
| 2% Sucrose Dipalmitate | 4.9 | 89 | 63 | 93 | 73 |
| 2% Sucrose Distearate | 4.6 | 89 | 68 | 104 | 80 |

EXAMPLE II

This example illustrates the preparation of active dry yeast products of the present invention and compares their leavening activity after being rehydrated both in water at 100° F. and 70° F. with the leavening activity of control samples. Also this example illustrates the high degree of storage stability of the active dry yeast products of the present invention.

4 grams of sucrose distearate were suspended in 80 ml. of a 1% sodium hydroxide solution and the suspension was then heated to about 170° F. To this suspension was added 1.6 grams of a BHA-peanut oil solution, also at 170° F., containing 0.2 gram BHA. This suspension was diluted with 50 ml. of hot tap water and blended in a Waring Blendor for a few minutes, after which it was cooled to about 130° F., added to 1 kg. of cream yeast containing 20 percent yeast solids and mixed for 15 minutes. The treated yeast was concentrated by vacuum filtration and pressing and then extruded and dried in the same manner as Example I. Another sample was prepared in exactly the same manner except BHT was substituted for BHA.

Portions of the products were rehydrated in water at 100° F. and 70° F. and then checked for leavening activity in a sweet dough formula. Other portions of the products were stored for 7 days at 115° F. in an oxygen containing atmosphere and then checked for leavening activity in a sweet dough formula. The results of the tests are given in Table II.

EXAMPLE III

This example illustrates the effect of sucrose esters on the leavening activity of yeast which has been rehydrated in warm and cool water. The sucrose esters selected for testing were those within and without the scope of the present invention.

Diesters 7.8 grams of sucrose distearate were suspended in 156 ml. of a 1% NaOH solution and the suspension heated to 170° F. in 15 minutes, cooled to 160° F. and slowly incorporated into 2 kg. of yeast containing 19.5 percent solids and with thorough mixing. The treated yeast was concentrated by vacuum filtration and pressing to 34.7 percent solids. A small amount of water was added to the pressed cake to adjust the solids content to 32 percent. The yeast was then extruded into spaghetti form and dried in a temperature range from 95° to 120° F. and at a relative humidity of from about 70 to about 10 percent. The drying time was about 6 hours.

4.3 grams of sucrose dipalmitate were suspended in 33 ml. of peanut oil and the suspension heated to 170° F. in 5 minutes, added to 110 ml. of water at 120° F. and blended for 10 minutes in a Waring Blendor. This preparation was cooled to 95° F. and added to 1 kg. of cream yeast having a solids content of 21.5 percent. The treated yeast was concentrated by vacuum filtration and pressing to 33 percent solids. This sample was extruded and dried in the same manner described above.

Monoesters 4.0 grams of sucrose monostearate were suspended in 45 ml. of water and the suspension heated to 120° F. with mixing, cooled to 80° F. and slowly incorporated into 1 kg. of cream yeast containing 20.0 percent solids and thoroughly mixed. The treated yeast was concentrated and dried in the same manner as above.

7.4 grams of sucrose monomyristate were suspended in 148 ml. of water and the suspension heated with stirring to 170° F. The suspension was then cooled to 130° F. and slowly incorporated into 1.2 kg. of cream yeast containing 21.5 percent solids with thorough mixing. The treated yeast was concentrated and dried in the same manner as above.

4 grams of sucrose monolaurate were suspended in 45 ml. of water and the suspension heated to 160° F., cooled to 80° F. and added to 1 kg. of cream yeast containing 20 percent yeast solids with thorough mixing. The treated yeast was concentrated and dried in the same manner as above.

Sucrose monopalmitate was used in preparing a yeast sample. This sample was handled in the same manner as the preceding sample.

Unsaturated sucrose ester 4 grams of sucrose dioleate were suspended in 80 ml. of a 1 percent NaOH solution and the suspension heated to

TABLE II

| Treatment | Percent Moisture | Rehydrated at 100° F. | | Rehydrated at 70° F. | | Leavening Activity After Storage for 7 Days at 115° F. in an Oxygen Containing Atmosphere [1] | |
|---|---|---|---|---|---|---|---|
| | | Fermentation Time | Proof Time | Fermentation Time | Proof Time | Fermentation Time | Proof Time |
| Control | 7.7 | 78 | 64 | 97 | 79 | 169 | 146 |
| Do | 4.8 | 126 | 100 | ([2]) | ([3]) | 173 | 142 |
| 2% sucrose distearate +0.1% BHA | 4.7 | 82 | 66 | 85 | 68 | 109 | 87 |
| 2% sucrose distearate +0.1% BHT | 4.6 | 83 | 64 | 89 | 69 | 109 | 93 |

[1] These samples were rehydrated at 100° F.
[2] Over 300.
[3] Very slow.

190° F. with stirring. To this suspension was added 50 ml. of hot water and the suspension blended for a few minutes in a Waring Blendor and cooled to about 130° F. This suspension was added to 1 kg. of cream yeast containing 20 percent yeast solids and then mixed for 15 minutes. The treated yeast was concentrated and dried in the same manner as above.

Portions of the yeast samples were rehydrated in water at 100° F. and 70° F. and then checked for leavening activity in a sweet dough formula. The results of the tests are given in the following Table III. These results show that sucrose esters which are not within the scope of the present invention detrimentally affects the leavening activity of yeast rehydrated in water at 70° F.

TABLE III

| Treatment | Percent Moisture | Leavening Activity of the Dried Yeast | | | |
|---|---|---|---|---|---|
| | | Rehydrated at 100° F. | | Rehydrated at 70° F. | |
| | | Fermentation Time | Proof Time | Fermentation Time | Proof Time |
| Control | 7.7 | 94 | 73 | 146 | 117 |
| 2% Sucrose Distearate | 7.0 | 86 | 69 | 89 | 72 |
| Control | 7.8 | 85 | 67 | 114 | 86 |
| 2% Sucrose Dipalmitate | 6.9 | 80 | 65 | 100 | 75 |
| Control | 8.1 | 84 | 66 | 108 | 80 |
| 2% Sucrose Monostearate | 6.1 | 91 | 73 | 164 | 124 |
| Control | 8.4 | 85 | 64 | 107 | 83 |
| 2% Sucrose Monomyristate | 7.0 | 104 | 89 | 225 | (1) |
| Control | 8.1 | 93 | 73 | 123 | 97 |
| 2% Sucrose Monolaurate | 6.6 | 134 | 105 | 329 | (1) |
| Control | 8.1 | 84 | 66 | 108 | 80 |
| 2% Sucrose Monopalmitate | 7.1 | 97 | 76 | 175 | 130 |
| Control | 7.7 | 78 | 64 | 99 | 79 |
| 2% Sucrose Dioleate | 6.7 | 90 | 69 | 173 | 132 |

[1] Very slow.

What is claimed is:

1. An active dry yeast comprising yeast having a moisture content below about 7.5% by weight and a small but effective amount of a sucrose diester derived from a saturated fatty acid having a carbon chain length greater than 12, which ester imparts to said yeast superior leavening activity.

2. An active dry yeast as defined in claim 1, wherein the moisture content is from about 4 to about 7 percent by weight.

3. An active dry yeast as defined in claim 2, wherein the sucrose diester is selected from the group consisting of sucrose distearate and sucrose dipalmitate.

4. An active dry yeast as defined in claim 3, wherein the amount of sucrose diester is between about 1 and 3 percent by weight based on the weight of the yeast solids.

5. An active dry yeast as defined in claim 1, containing a small amount of an antioxidant effective to impart substantial storage stability in air to said yeast.

6. An active dry yeast as defined in claim 5, wherein the antioxidant is butylated hydroxyanisole or butylated hydroxytoluene.

7. An active dry yeast as defined in claim 5, wherein the sucrose diester imparts to the yeast the characteristic that it can be rehydrated in water at a temperature of about 70° F. without substantial reduction of its leavening activity occurring.

8. An active dry yeast as defined in claim 6, wherein the amount of antioxidant is between about 0.025 to about 0.5 percent by weight based on the weight of the yeast solids.

9. An active dry yeast as defined in claim 4, wherein the sucrose diester is provided in the active dry yeast by forming an aqueous alkaline suspension of the diester, incorporating the suspension into an aqueous suspension of yeast cells and drying the yeast to a moisture content of below about 7.5 percent by weight.

10. An active dry yeast as defined in claim 3, containing between about 0.025 and about 0.5 percent by weight based on the weight of the yeast solids of an antioxidant selected from the group consisting of butylated hydroxyanisole and butylated hydroxytoluene.

References Cited

UNITED STATES PATENTS 2,894,842  7/1959  Mitchell _____ 99—96
3,041,249  6/1962  Chen et al. _____ 195—74

A. LOUIS MONACELL, *Primary Examiner.*

D. M. NAFF, *Assistant Examiner.*